US007044583B2

(12) United States Patent
Marten et al.

(10) Patent No.: US 7,044,583 B2
(45) Date of Patent: May 16, 2006

(54) METHOD AND DEVICE FOR EXPOSING A PRINTING FORM, PRINTING UNIT AND PRINTING PRESS HAVING THE DEVICE

(75) Inventors: Peter Marten, Heiligkreuzsteinach (DE); Gotthard Schmid, Malsch (DE)

(73) Assignee: Heidelberger Druckmaschinen AG, Heidelberger (DE)

( * ) Notice: Subject to any disclaimer, the term of this patent is extended or adjusted under 35 U.S.C. 154(b) by 83 days.

(21) Appl. No.: 10/281,028

(22) Filed: Oct. 25, 2002

(65) Prior Publication Data

US 2003/0081106 A1 May 1, 2003

Related U.S. Application Data

(60) Provisional application No. 60/337,667, filed on Nov. 8, 2001.

(30) Foreign Application Priority Data

Oct. 25, 2001 (DE) .......................................... 101 52 846

(51) Int. Cl.
*B41J 2/15* (2006.01)

(52) U.S. Cl. .......................... 347/40; 347/225; 347/237

(58) Field of Classification Search .................. 347/40, 347/12, 37, 225, 237, 238, 247, 130, 152
See application file for complete search history.

(56) References Cited

U.S. PATENT DOCUMENTS 5,477,259 A 12/1995 Iwasa
6,037,962 A 3/2000 Hanson et al.
6,323,890 B1 * 11/2001 Muto et al. ................. 347/237

FOREIGN PATENT DOCUMENTS

| | | | |
|---|---|---|---|
| DE | 198 40 926 | A1 | 5/2000 |
| DE | 100 31 162 | A | 1/2002 |
| EP | 0 947 950 | A2 | 10/1999 |
| JP | 63048054 | A | 2/1988 |
| JP | 63059256 | A | 3/1988 |

* cited by examiner

*Primary Examiner*—Lamson Nguyen
(74) *Attorney, Agent, or Firm*—Laurence A. Greenberg; Werner H. Stemer; Gregory L. Mayback

(57) ABSTRACT

A method for exposing a printing form includes providing a plurality of exposure channels disposed in a two-dimensional array, and inputting energy, by the exposure channels of a column of the array, for an image element on the printing form. Further included are steps for activating a first row of the array of exposure channels for producing a first component of the input of energy assigned to each column of the array in one row of image elements, moving the printing form relative to the exposure channels, and activating a second row of the array of exposure channels for producing a second component of the input of energy assigned to each column of the array when a point of projection of the exposure channel of a second row of the array comes to lie on the image element of the row already exposed by the exposure channel of the first row and the same column. A device for implementing the method and a printing unit and a printing press including the device are also provided.

14 Claims, 5 Drawing Sheets

20

22

24

24

METHOD AND DEVICE FOR EXPOSING A PRINTING FORM, PRINTING UNIT AND PRINTING PRESS HAVING THE DEVICE

CROSS REFERENCE TO RELATED APPLICATION

This application claims the benefit under 35 U.S.C. § 119(e) of copending provisional application No. 60/337,667, filed Nov. 8, 2001.

BACKGROUND OF THE INVENTION

Field of the Invention

The invention relates to a method and a device for exposing a printing form, using a number of exposure channels which are disposed in a two-dimensional array. The exposure channels of a column of the array cause an input of energy for an image element on the printing form. The method includes the steps of activating a first row of the array of exposure channels for producing a first component of the input of energy associated with or assigned to each column of the array in one row of image elements and moving the printing form relative to the exposure channels. The invention also relates to a printing unit and a printing press having the device.

For image-setting (i.e., imaging) or exposing printing forms in printing presses, whether in printing form exposers or in so-called direct-imaging printing units, a number of image elements are often produced in a time-parallel manner on the printing form as a result of inputting energy by a number of exposure channels.

Published European Patent Application EP 0 947 950 A2, corresponding to U.S. Pat. No. 6,037,962, discloses a typical imaging method performed by a multi-beam laser exposure device. In that method, a plurality of image elements in a row are exposed in a time-parallel manner. A relative displacement between the exposure device and an image carrier is then performed in accordance with rules which avoid a position of points of projection, i.e., those points at which light falls on the image carrier, on already exposed image elements, before a plurality of image elements are again exposed in a time-parallel manner. That procedure is repeated and includes displacements in the two linearly independent directions of the surface of the image carrier.

For example, it has become known heretofore from U.S. Pat. No. 5,477,259 that parallel exposure does not have to be restricted to a plurality of exposure channels disposed in a row. That U.S. patent describes a multi-beam laser exposure device which has laser light sources disposed in a two-dimensional array. It is therefore possible for a multiplicity of rows of a number of image elements which are each associated with or assigned to a number of exposure channels to be exposed in a time-parallel manner.

In a procedure of the hereinafore-described type, a lower limit for the duration of the complete exposure of the printing form is equal to that time which is required for the complete production of an image element, multiplied by the total number of image elements on the printing form and divided by the number of exposure channels available in one exposure step (irrespective of a one-dimensional or two-dimensional configuration). Furthermore, typically additional time is required in order to guide the points of projection of the exposure channels, the number of which lies considerably below the total number of image elements to be exposed, over the two-dimensional surface of the printing form. The points of projection are to be understood as those points at which light falls onto the printing form when the exposure channel is open. Furthermore, additional time for relative displacements is needed, if an image element is to be built up in a structured manner from individual exposure points. These movements are often slow or take place in steps. The exposure duration will therefore, in practice, generally be greater than this lower limit.

A disadvantage of the afore-described method is that the lower time limit for the exposure duration which can be achieved by a plurality of image-setting or imaging channels through the parallel processing cannot be reached, because additional time is required due to relative displacements of the printing form in relation to the image-setting or imaging channels.

SUMMARY OF THE INVENTION

It is accordingly an object of the invention to provide a method and a device for exposing a printing form as well as a printing unit and a printing press having the device, which overcome the hereinafore-mentioned disadvantages of the heretofore-known methods and devices of this general type and which permit a brief exposure time.

With the foregoing and other objects in view, there is provided in accordance with the invention, a method for exposing a printing form, which comprises providing a plurality of exposure channels disposed in a two-dimensional array. Energy is input, by the exposure channels of a column of the array, for an image element on the printing form. A first row of the array of exposure channels is activated for producing a first component of the input of energy assigned to each column of the array in one row of image elements. The printing form is moved relative to the exposure channels. A second row of the array of exposure channels is activated for producing a second component of the input of energy assigned to each column of the array when a point of projection of the exposure channel of a second row of the array comes to lie on the image element of the row already exposed by the exposure channel of the first row and the same column.

In accordance with another mode, the method of the invention further includes, providing that at least two points of projection of two exposure channels in a column of the array do not coincide at one time on the printing form.

In accordance with a further mode, the method of the invention further includes repeating the activating step for each further row of the array of exposure channels when the point of projection of the exposure channel of the further row of the array comes to lie on the image element already exposed by the exposure channel of the first row and the same column.

In accordance with an added mode, the method of the invention further includes simultaneously activating the first row of the array of exposure channels for producing a first component of the input of energy assigned to each column of the array in a further row of image elements, while activating the second row of the array of exposure channels to produce a second component of the input of energy prescribed for each column of the array when the point of projection of the exposure channel of a second row of the array comes to lie on the image element belonging to the chronologically previously exposed row and already exposed by the exposure channel of the first row and the same column.

In accordance with an additional mode, the method of the invention further includes providing an array of regularly disposed imaging channels as the array of channels.

In accordance with yet another mode, the method of the invention further includes locating the point of projection of an exposure channel in the first row and in a specific column, and the point of projection of an exposure channel in the second row and in the same column, disjunctively in relation to one another in an image element.

In accordance with yet a further mode, the method of the invention further includes providing that the points of projection of an exposure channel in the first row and in a specific column, and the point of projection of an exposure channel in the second row and in the same column coincide in an image element.

In accordance with yet an added mode, the method of the invention further includes holding the printing form on a carrier element. The movement of the printing form relative to the exposure channels is produced by rotating the carrier element about an axis.

In accordance with yet an additional mode, the method of the invention further includes providing that the first component and the second component for producing the input of energy are of at least approximately the same size.

In accordance with still another mode, the method of the invention further. includes forming the plurality of imaging channels by light beams originating from a plurality of individually activatable laser light sources.

With the objects of the invention in view, there is also provided a device for implementing a method of exposing a printing form, comprising a plurality of exposure channels disposed in a two-dimensional array. The exposure channels of a column of the array serve for causing an input of energy for an image element on the printing form. A control unit includes a computing unit wherein a computer program is operative. The computing unit has a memory unit wherein the computer program is at least partially stored. The computer program serves for performing a row-by-row activation of the array of exposure channels for activating a second row of the array of exposure channels for producing a second component of the input of energy assigned to each column of the array when a point of projection of the exposure channel of a second row of the array comes to lie on the image element of the row already exposed by the exposure channel of a first row and the same column.

In accordance with another feature of the invention, the two-dimensional array of exposure elements extends over the full length of the printing form.

With the objects of the invention in view, there is additionally provided a printing unit, comprising a device for implementing a method of exposing a printing form. The device includes a plurality of exposure channels disposed in a two-dimensional array. The exposure channels of a column of the array serve for causing an input of energy for an image element on the printing form. A control unit includes a computing unit wherein a computer program is operative. The computing unit has a memory unit wherein the computer program is at least partially stored. The computer program serves for performing a row-by-row activation of the array of exposure channels for activating a second row of the array of exposure channels for producing a second component of the input of energy assigned to each column of the array when a point of projection of the exposure channel of a second row of the array comes to lie on the image element of the row already exposed by the exposure channel of a first row and the same column.

With the objects of the invention in view, there is concomitantly provided a printing press, including at least one printing unit including a device for implementing a method of exposing a printing form. The device includes a plurality of exposure channels disposed in a two-dimensional array. The exposure channels of a column of the array serve for causing an input of energy for an image element on the printing form. A control unit includes a computing unit wherein a computer program is operative. The computing unit has a memory unit wherein the computer program is at least partially stored. The computer program serves for performing a row-by-row activation of the array of exposure channels for activating a second row of the array of exposure channels for producing a second component of the input of energy assigned to each column of the array when a point of projection of the exposure channel of a second row of the array comes to lie on the image element of the row already exposed by the exposure channel of a first row and the same column.

In the method of exposing a printing form in accordance with the invention, wherein a number of exposure channels are provided which are disposed in a two-dimensional array, provision is made for the exposure channels of a column of the array to serve for producing an image element and, for this purpose, causing an input of energy for an image element on the printing form. Expressed in other words, the exposure channels in different rows but in the same columns therefore serve proportionately for producing an exposed point in an image element associated with or assigned to the column in a row on the printing form. The number of columns determines the number of image elements in a row. At a given instant or at a time, in this regard, at least points of projection from two exposure channels in one column of the array cannot coincide on the printing form. To produce a first component of the input of energy associated with each column of the array in a row of image elements, a first row of the array of exposure channels is activated at a first time. Here, activation includes, firstly, switching the exposure channel on and off for a time period which can be one interval or a plurality of intervals and, secondly, an input of energy with a specific amount of energy, it being possible for the amount of energy either to be constant over time when the exposure channel is open (switched on) or to vary over time, the integral of the amount of energy over the time representing the input of energy.

The printing form is moved relative to the exposure channels. For relative movement, it is unimportant whether the exposure channels or the printing form or both are moved. A relative movement in connection with the invention, in this regard, has at least one velocity vector component in a direction perpendicular to the optical axis of the exposure channels which strike the printing form. Expressed in other words, a change in spacing resulting from the relative movement is unnecessary, preferably even not provided, while the velocity has at least one tangential component.

The method according to the invention is distinguished by the fact that, to produce a second component of the input of energy associated with or assigned to each column of the array, a second row of the array is activated at a second time when the point of projection of the exposure channel of a second row of the array comes to lie on the image element of the row already exposed by the exposure channel of the first row and the same column. In other words, as a result of the relative movement, the points of projection of the second row of the array will come to lie at a second time on the image elements exposed by the first row at a first time, so that a second component of the input of energy can be provided. The total input of energy for an image element is provided gradually over time or successively in components through exposure channels in different rows but the same column in the array of exposure channels. In this regard, an input of energy onto the printing form is performed in a time-parallel or simultaneously proportional manner for a plurality of image elements. The input of energy and the division into individual components can be determined in advance.

It should be noted, firstly, that the portion of an exposure channel can also be zero. Secondly, it should be pointed out that either the point of projection of the exposure channel of a second row of the array can be moved into the image element from outside as a result of the relative movement as time progresses, or the point of projection is already located within the image element at the first time, but that a relative movement is used in order to exploit the shifted position thereof for exposure at a second time.

For the case wherein, in addition to the first and second row, further rows exist in the array of exposure channels, the activation step can be repeated for each further row of the array of exposure channels when the point of projection of the exposure channel of the further row of the array comes to lie on the image element already exposed by the exposure channel of the first row and the same column. It is therefore possible for an input of energy to be made proportionately by a plurality of rows.

Depending upon the material of the printing form which is to be imaged or on which an image is to be set, and depending upon the basic imaging process, the exposure channels may include different energy sources or originate from different energy sources. It is also possible for a plurality or for all of the exposure channels to be generated based upon one energy source. An energy source can be a light source, a laser light source, in particular a diode laser or solid body laser, a thermal energy source, a microwave source or the like. Different beam forming elements, such as focusing or defocusing lenses, guide elements, filters or the like, and/or intensity modulators, such as electro-optical or acousto-optical modulators for light, can act upon the individual exposure channels. The number of imaging channels is preferably formed by the light beams originating from a number of individually activatable light sources, in particular laser light sources.

In the case of a light source as energy source (or a plurality of energy sources), this may be in particular an ultra-short pulsed laser. Ultra-short pulses from a laser are able to interact with a surface by disruptive ablation, so that with a specific input of energy, a specific amount of material can be removed. Expressed in other words, a specific removal is possible by a specific, predetermined input of energy, in particular this removal can be additive for two successive inputs of energy.

In this connection, reference should be made to the electrochemical surface processes which are initiated by the input of energy, preferably by the input of laser energy, which have a linear dependence upon the input of energy. Galvanic processes can be caused by chemical reactions triggered by ions or radicals produced by the input of energy. Chromium is preferred for such a surface.

The printing form may in particular be a rewriteable printing form. Here, by being rewriteable it is understood that the printing form can be subjected both to a structuring process, which serves for producing image-carrying (for example hydrophobic or lipophilic) and non-image-carrying (for example hydrophilic or lipophobic) macroscopic areas, and also to a destructuring process. The destructuring process can be formed, for example, in such a way that image-carrying and non-image-carrying areas are produced at the microscopic level, in particular in a stochastic configuration (so-called noise).

The method of exposing a printing form according to the invention can also include, in addition to the aforedescribed steps, simultaneously activating the first row of the array of exposure channels for producing a first component of the input of energy associated with or assigned to each column of the array in a further row of image elements while activating the second row of the array of exposure channels to produce a second component of the input of energy prescribed for each column of the array when the point of projection of the exposure channel of a second row of the array comes to lie on the image element belonging to the chronologically previously exposed row and already exposed by the exposure channel of the first row and the same column.

In an advantageous manner, the method according to the invention, which includes an input of energy into an image element in chronologically successive components, can effect a short exposure time of the printing form: an image element is exposed by a number of components of the overall input of energy, it being true of each proportional exposure that this is appropriately shorter, proportional to the component, when the action of the input of energy is additive. The necessary time for the total input of energy through the sum of the components for an image element is consequently that time for an input of energy of the entire magnitude in a single exposure.

As a result of the proportional exposure in chronologically successive steps, however, it is possible to increase the relative movement between printing form and exposure unit: the tolerable maximum relative speed is determined by the path traced by a point of projection of an imaging channel on the printing form. In the exposure time, for a uniform movement, the typical case for the exposure, the path is equivalent to the exposure time multiplied by the relative speed. For the method according to the invention, it is now true that the exposure time for the component of the input of energy is shortened in proportion to the component. The time saved can be exploited for increasing the relative speed. As a result, faster exposure of the printing form than in alternative methods is possible. The method according to the invention requires an exposure time which lies closer to the lower time limit, which is determined in itself by the exposure process of the surface interaction, than in alternative methods. Exposure in discrete steps, i.e., alternation of exposure and displacement steps, can be avoided. As an alternative to shortening the total exposure time, it is also conceivable to exploit the time advantage for the exposure of a less sensitive surface of the printing form.

Even if the input of energy by components is not or is only approximately additive, a short exposure time can advantageously be achieved by the method according to the invention, because the time gain of faster relative movement between printing form and exposure unit can more than compensate for the possible implicit time loss caused by a longer overall exposure time of an image element.

In this connection, it becomes clear that it is advantageous if the magnitude of the input of energy is of at least approximately the same size for each component. Expressed in other words, the expected overall input of energy and the maximum overall input of energy, respectively, for an image element is represented by components which are at least approximately equal to the overall input of energy divided by the number of rows available in the array. It is then true that the first component and the second component for producing the input of energy are of at least approximately the same size. This is correspondingly true of each further component involved in the preferred use of the method according to the invention with arrays which have more than two rows. As a consequence, an exposure can be performed in a simple manner with uniform component steps.

The time advantage gained by the method according to the invention can also be exploited advantageously in a different connection, in addition to a maximum faster relative speed: the relative speed can be selected within certain limits, from the original relative speed up to the maximum, fast relative speed. As a result, it is possible to avoid vibrations which occur as a result of resonances at specific operating parameters, in particular relative speeds, by selecting a relative speed that avoids the resonances.

The method according to the invention can serve advantageously both for imagesetting or imaging in a dpi format (dots per inch) and for imagesetting or imaging in an lpi format (lines per inch).

In an advantageous mode of the method according to the invention, an array of regularly disposed imaging channels is used. In connection with the invention, a regular configuration is to be understood to be that the points of projection of the individual imaging channels lie at least approximately on grid points spaced apart uniformly from row to row (including those having a first width in columns and having a second width in the row direction) on the printing form (even on a curved surface). The directions defined by the rows and columns need not necessarily be orthogonal to one another, but can advantageously be so. The uniformity relates firstly to the projections of the distances onto the two orthogonal directions, in particular to the column direction, and secondly to the identity of the distances in a specific row and/or a specific column, respectively. This uniformity can also apply globally for the entire grid of the points of projection.

An image element can be produced from a number of exposure points, produced in one image element by the input of energy at the points of projection of an exposure channel. In a first mode of the method according to the invention, provision is made for the point of projection of an exposure channel in the first row and in a specific column, and the point of projection of an exposure channel in the second row and in the same column, to lie disjunctively in relation to one another in an image element. It is therefore possible to build up an image element from exposure points which lie beside one another, in this case also touching. The relationship between the area of the points exposed and the total area of the image element influences the tonal value of the image element, and at the same time the structure of the image element can be influenced (amplitude-modulated or frequency-modulated) by building up the image element from individual exposure points, for the configuration of which there are various possibilities.

In a second alternative mode of the method according to the invention, on the other hand, provision is made for the points of projection of an exposure channel in the first row and in a specific column, and the point of projection of an exposure channel in the second row and in the same column, to coincide in an image element, i.e., lie at least approximately above one another. An image element will then have at least approximately one exposure point, the area of which in relation to the total area of the image element influences the tonal value. Depending upon the uniformity of the grid of the points of projection, which is explained in greater detail hereinabove, these exposure points will lie uniformly on the printing form.

In order to implement the method according to the invention, it is expedient for the printing form to be held on a carrier element, and for the movement of the printing form relative to the exposure channels to be produced by rotation of the carrier element about an axis. This is in particular advantageous for use in a direct-imaging printing unit or a drum exposer (computer-to-plate exposer). The printing form . can also in itself form the surface of the carrier element.

On the one hand, the method according to the invention can be performed by an array, wherein all of the rows expose image elements, with interaction between the exposure channels in one column. In order to minimize the time needed for the relative movement (displacement) between printing form and exposure channels, it is therefore expedient for the first and the second row in the array of imaging channels to be adjacent. This is true for each further row involved for the preferred use of the method according to the invention with arrays which have more than two rows. Exposure of the image element can then be performed in one pass of the points of projection. On the other hand, it is also possible, in analogy with the parallel configuration of a plurality of rows of imaging channels in a two-dimensional array, to dispose a plurality of two-dimensional arrays interacting in accordance with the method of the invention. Expressed in other words, a first subset of the total set of image elements on the printing form is produced by a first array, and a second subset is produced by a second array, the arrays being operated by the method according to the invention. This subdivision can also be understood in another way: a given array with columns and rows can be subdivided into subarrays which, according to the method of the invention, in each case produce image elements. The arrays can cross over one another or lie beside one another. For the example of dividing an array into two subarrays, it should be indicated that, in a first division, all the even rows cooperate to produce image elements and all the odd rows cooperate to produce image elements and, in a second division, the first rows up to half the number of rows and the rows from half the rows up to the last row can cooperate. Other subdivisions can also be made. This is true of subdivisions into larger numbers of subarrays.

In connection with the concept of the invention, there is also provided a device for implementing the method of exposing a printing form according to the invention. The device according to the invention includes a number of exposure channels which are disposed in a two-dimensional array, and a control unit. The exposure channels of a column of the array cause an input of energy for an image element on the printing form. The control unit has a computing unit, wherein or in the memory of which a computer program runs. The computer program is stored at least partially in the memory unit. By using the computer program, row-by-row activation of the array of exposure channels is performed so that activation of a second row of the array of exposure channels for producing a second component of the input of energy assigned to each column of the array is performed when the point of projection of the exposure channel of a second row of the array comes to lie on the image element of the row already exposed by the exposure channel of a first row and the same column. Particularly advantageous is a device according to the invention wherein the two-dimensional array of exposure elements extends over the full length of the printing form (extends at least approximately in the direction of the rows of the array of exposure elements). If the printing form is held on a cylinder or forms the surface of a cylinder, it is the extent of the cylinder in the axial direction thereof which is involved.

The device according to the invention can be realized or implemented in a printing unit, a so-called direct-imaging printing unit. In particular, the printing unit according to the invention can be a direct or indirect planographic printing unit, a flexographic printing unit, an offset printing unit (standard or waterless) or the like. A printing press according to the invention has at least one printing unit according to the invention. The printing press can be a sheet-processing or a web-processing machine. Printing materials can be paper, board, paperboard, organic polymer films or the like.

Other features which are considered as characteristic for the invention are set forth in the appended claims.

Although the invention is illustrated and described herein as embodied in a method and a device for exposing a printing form as well as a printing unit and a printing press having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
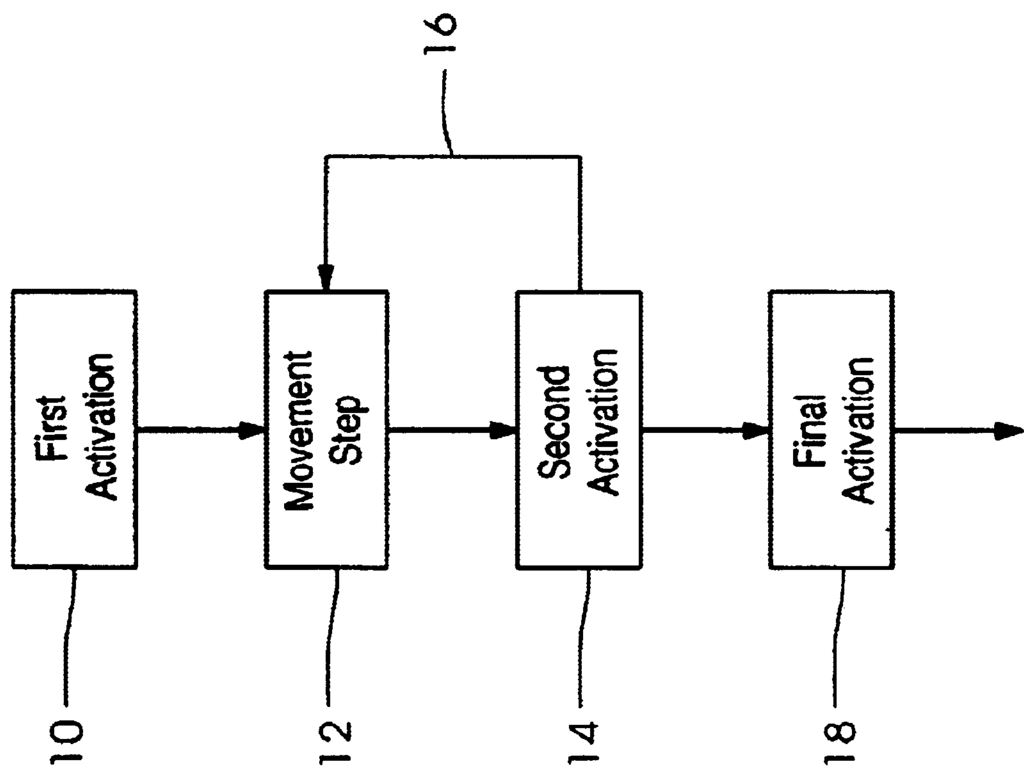
FIG. 1 is a flowchart of an advantageous mode of the method according to the invention.

Referring now to the figures of the drawings in detail and first, particularly, to FIG. 1 thereof, there is seen a flowchart of an advantageous mode of the method according to the invention based upon an image element which is produced by a plurality of imaging or image-setting channels in a column of an array of imaging or image-setting channels. As already described hereinbefore in detail, individual steps for the number of columns are performed in a time-parallel manner. Expressed in other words, the individual steps are performed line by line. In a first activation 10, for the purpose of producing a first component of the input of energy assigned to the image element, the intensity in the point of projection of the imaging channel in the first row is controlled. In a movement step 12, a relative movement of the printing form in relation to the column of the exposure channels takes place, while the intensity at the points of projection is reduced to below a sufficient threshold or to zero, so that interaction between the energy, which is transported through the exposure channel, and the surface of the printing form is avoided. In a second activation 14, in order to produce a second component of the input of energy assigned to the image element, the intensity at the point of projection of the imaging channel in the second row is controlled when the point of projection of the exposure channel lying in the second row of the array comes to lie on the image element of the line already exposed by the exposure channel of the first row. A repetition 16 of this procedure is performed for all further exposure channels of the column in all the rows involved in the array. A final activation 18 is performed by controlling the intensity at the point of projection of the imaging channel in the last row in order to produce a last component of the input of energy assigned to the image element. Typically, the relative movement between printing form and point of projection of the imaging channel is not zero during the activation steps. Furthermore, parallelization in time can be performed by staggering or interleaving the procedure described for one image element for a plurality of image elements to be produced by a column of imaging channels. Whereas, for a first image element, a chronologically succeeding activation 14, for example the second activation, is already being performed, the first activation 10 can be carried out for a second image element. In an analogous manner, the procedure can be the same for further image elements. Exceptions from this time parallelization are formed, so to speak as an edge effect, respectively, by the first activations 10 for the first image elements up to the number of imaging channels in the column and, correspondingly, the last activations 18 for the last image elements, unless the imaging is cyclic in the sense that the missing components of the first image elements are supplemented by the last imaging steps. For example, this avoidance of the edge effect is possible for image elements which lie on a closed curve.

Figure 2:
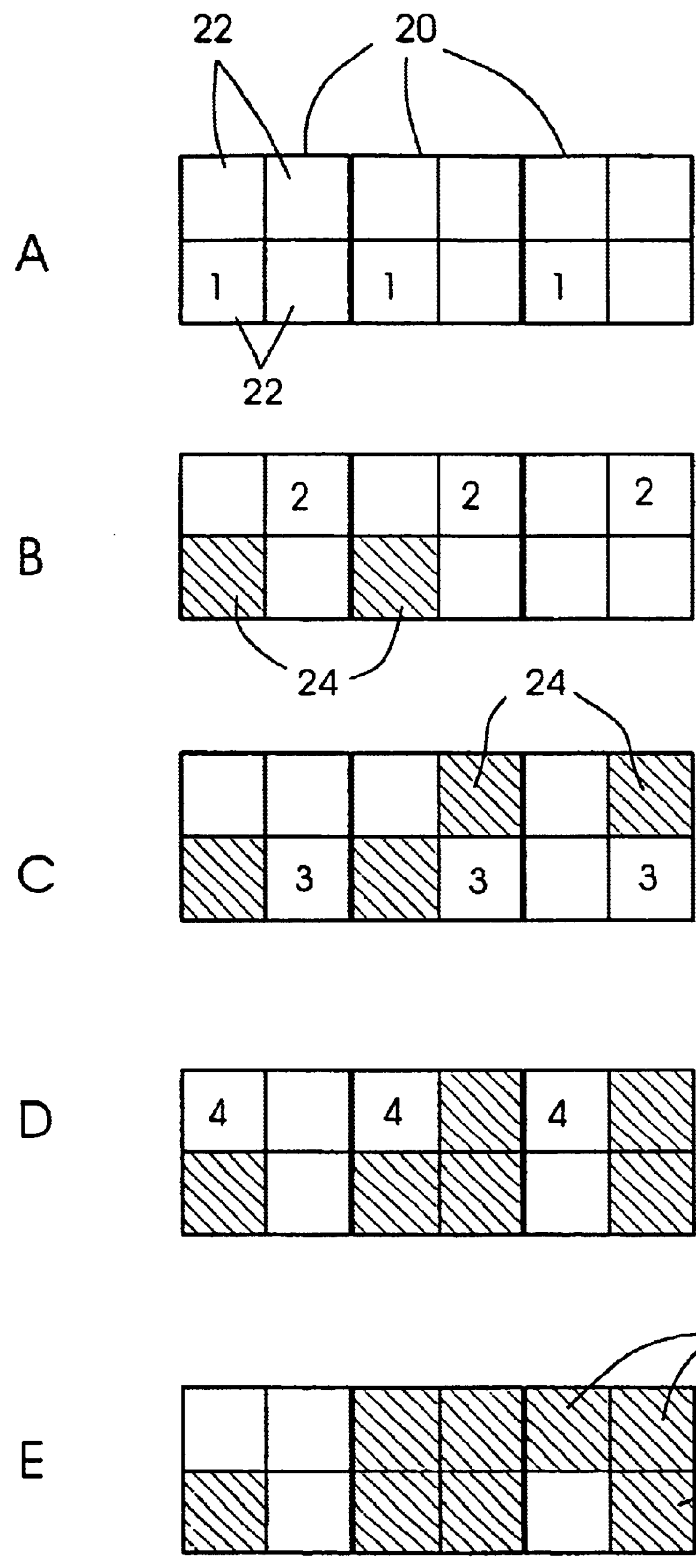
FIG. 2 is a diagrammatic view of a succession of partial images A to E for illustrating the exposure of an image element by successively placed exposure points.

FIG. 2 shows a succession of partial images A to E for illustrating diagrammatically the exposure of an image element by successively set exposure points and, by using an example of three image elements 20, respectively, including four exposure points 22, serves for explaining how an exposure can be carried out in accordance with the method of the invention, using points of projection which come to lie in a disjunctive manner in relation to one another in an image element 20, shown here, by way of example, as being mutually adjacent. In the partial image A of FIG. 2, the exposure of the bottom left-hand quadrants in a first step is diagrammatically illustrated by the number 1. Depending upon the input of energy (simplified digitally above or below the exposure threshold), an exposed point 24 is or is not produced. Partial image B of FIG. 2 shows, by way of example, that the exposure points 22 in the left-hand image element 20 and in the central image element 20 are exposed points 24. In the partial image B of FIG. 2, the exposure in a second step is illustrated by the number 2 and relates to the top right-hand quadrants of the image elements 20. Partial image C of FIG. 2 shows that, for the central image element 20 and the right-hand image element 20, exposed points 24 have been set. There then follows, in a third step, the imaging of the bottom right-hand quadrants, represented by the number 3. By way of example, the partial image D of FIG. 2 shows that, for the central image element 20 and the right-hand image element 20, exposed points 24 have been set. In a fourth step, the imaging of the top left-hand quadrants, represented by the number 4, takes place. The chronologically successive exposure of components of the input of energy, by way of example, result in exposed areas corresponding to half-tone values, as illustrated in the partial image E of FIG. 2: in the left-hand image element 20, 25% of the overall area has been exposed, in the central image element 20, 100% of the total area has been exposed, and in the right-hand image element 20, 75% of the total area has been exposed. FIG. 2 also shows, by way of example, that the 25% exposure in the left-hand image element need not be part of the 75% exposure in the right-hand image element. The structure or screening can be configured by the method of the invention. In general, moreover, exposure of the quadrants (the exposure points 22) in a different order or series for each individual image-element 20 independently of one another is also possible.

For those skilled in the art, it is believed to be clear that the regular configuration or subdivision, shown in FIG. 2, of the image element 20 into four exposure points 22 which lie regularly in quadrants of the image element 20 is no restriction on the more general situation of frequency-modulated distribution of the exposure points 22 in image elements 20. Expressed in another way, FIG. 2 is merely based upon a possible, exemplary configuration for explaining the chronologically successive or chronologically following exposure steps that have taken place in the method of the invention. Those skilled in the art will take measures directed to performing advantageous distribution of the exposure points 22 in image elements 20, including those with different distributions in different image elements. A procedure of this type is even advantageous in comparison with a regular configuration, distribution or subdivision.

Figure 3:
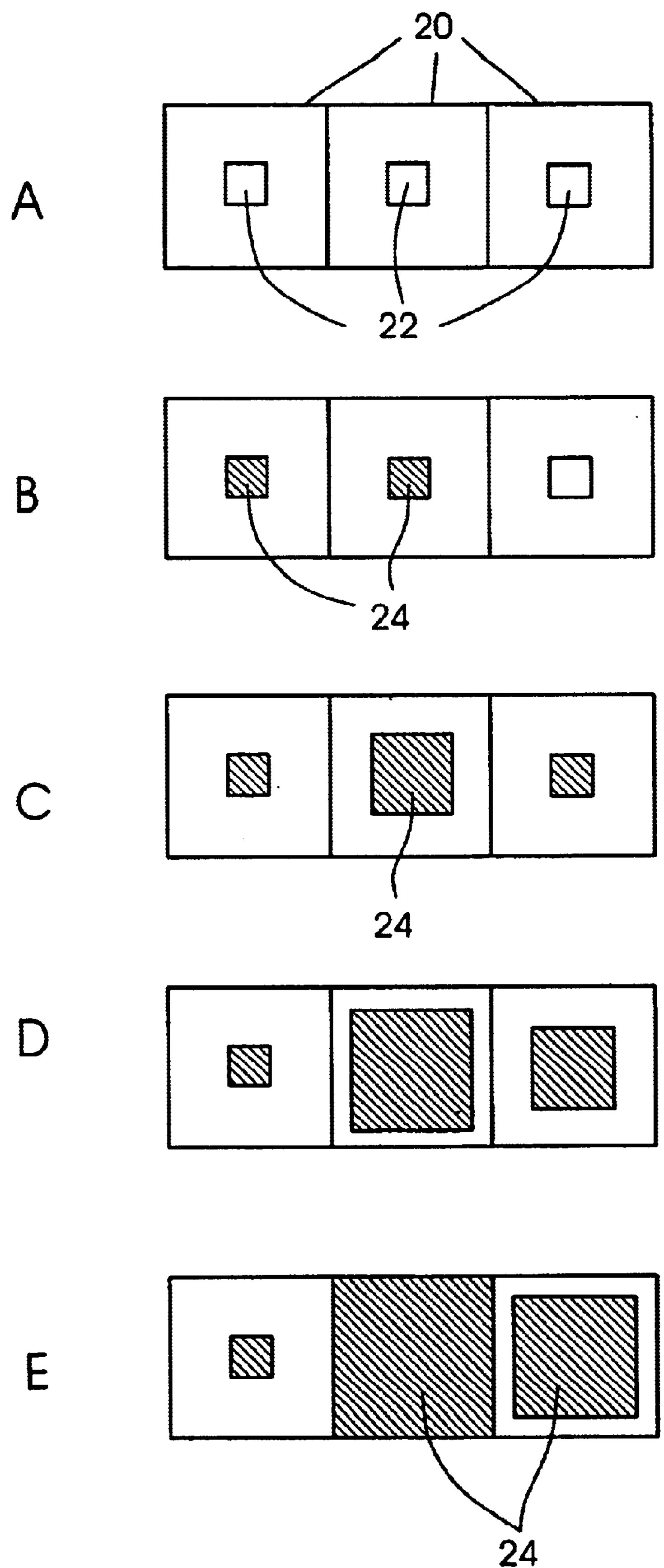
FIG. 3 is a diagrammatic view of a succession of partial images A to E for illustrating, in an alternative manner, the exposure of an image element by successively placed exposure points.

FIG. 3 shows a succession of partial images A to E for diagrammatically illustrating the exposure of an image element by successively placed exposure points in an alternative manner, according to the method of the invention. In partial image A of FIG. 3, by way of example, three image elements 20 are shown, respectively, having an exposure point 22, centered here by way of example. An exposure in four steps is to be provided, using four equal components of the overall input of energy. In accordance with an exemplary first exposure step with a first component of the input of energy, exposed points 24 are produced in the left-hand image element 20 and in the central image element 20 in the partial image B of FIG. 3. The partial image C of FIG. 3 shows the situation after an exemplary second exposure step with a second component of the input of energy. The area of the central exposure point 22 has been doubled, while an exposed point 24 has been produced in the right-hand image element 20. The partial image D of FIG. 3 shows the image elements 20 after an exemplary third exposure step: the area of the central exposure point 22 has increased by a half, as compared with the partial image C of FIG. 3, while the area of the exposed point 24 in the right-hand image element 20 has been doubled. Finally, the partial image E of FIG. 3 shows the situation after an exemplary fourth exposure step with a fourth component of the input of energy. As a result, the left-hand image element 20 has an exposed area of 25% of the total area, the central image element 20 has been exposed over 100% of the total area, while the right-hand image element 20 has had 75% thereof exposed.

In general, it should be noted further that the square shape of image elements and exposure points of embodiments illustrated in FIGS. 2 and 3 has been selected merely by way of example. The image elements or exposure points can in particular also be round, rectangular or oval. Furthermore, they can be distorted in the direction of movement during the activation, as a result of the relative movement between the point of projection of the exposure channel and the printing form.

Figure 4:
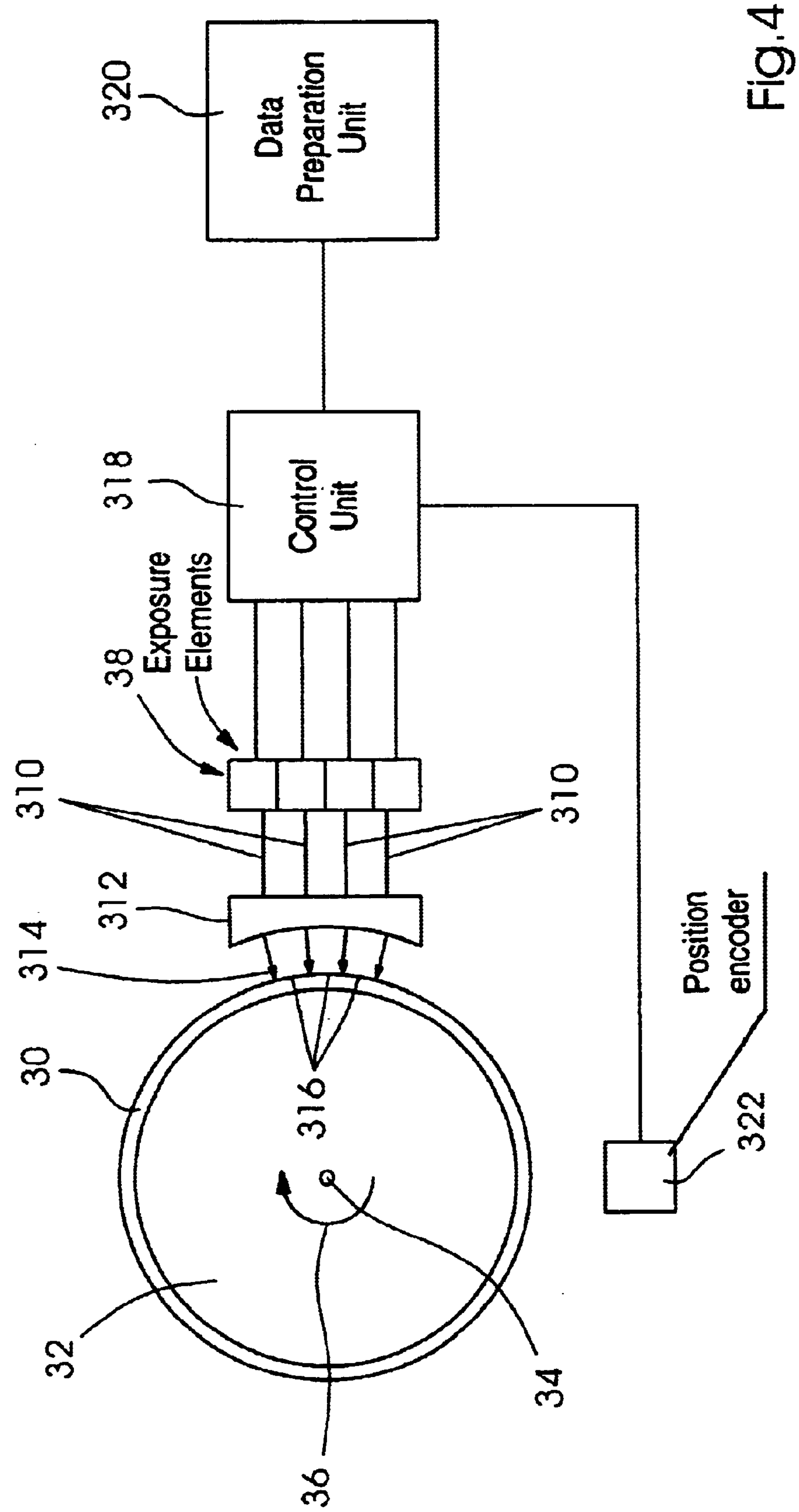
FIG. 4 is a diagrammatic, side-elevational view and block-diagram of a device for exposing a printing form by the method of the invention.

FIG. 4 is concerned diagrammatically with a side view or a lateral sectional image of a device for exposing a printing form by the method of the invention. FIG. 4 shows a printing form 30 suitably held on a carrier element 32, here a cylinder as an example. The carrier element 32 is rotatable about an axis 34 in the direction of rotation represented by the arrow 36, and therefore constitutes a body of rotation, here a symmetrical body of rotation. The rotation is provided by a non-illustrated drive. Imaging channels 310 originating from an array of exposure elements 38, for example light sources, laser light sources, photon-emitting layers (infrared, visible or ultraviolet) or the like, are shown. By way of example, four exposure channels 310 are shown here. They form one column of a two-dimensional array of exposure channels, which extends in a direction perpendicular to the plane of the drawing. By a projection element 312, the exposure channels 310 are imaged at points of projection 314 on the surface of the printing form 30. The points of projection 314 lie uniformly at intervals 316. Assuming a uniform rotational movement of the printing form 30, one point on the. surface consequently requires the same amount of time to move from the position of a first point of projection 314 to an adjacent point of projection 314 as from the position of a second point of projection 314 to a second point of projection 314 adjacent to the latter.

The array of exposure elements 38 is provided with a control unit 318. The control unit 318 includes a digital or computing unit (a computer or the like) with a memory unit. Stored in the memory unit of the computing unit, at least to some extent and at least for one time interval, is a program. In this embodiment, the memory unit is a familiar RAM. As an alternative thereto, the memory unit can be a hard disk or a data medium having a magnetic, magneto-optical or optical basis. A computing unit executes the program, so that activation of the imaging channels 314 is performed in accordance with the invention. Expressed in other words, a computer program runs on the computing unit and performs or executes an activation of the imaging channels 314 in steps according to the method of the invention. The control unit 318, which in particular controls the intensity and/or the exposure time of the imaging channels 314, is connected to a data preparation unit 320. By using image information in a given format, for example following the standards pdf (portable data format), TIFF or ps (post script), data for the necessary intensities and exposure times can be made available to the control unit 318. Furthermore, the control unit 318 has a position encoder 322 for determining the position (coordinate position) of the printing form 30 on the rotatable carrier element 32.

Figure 5:
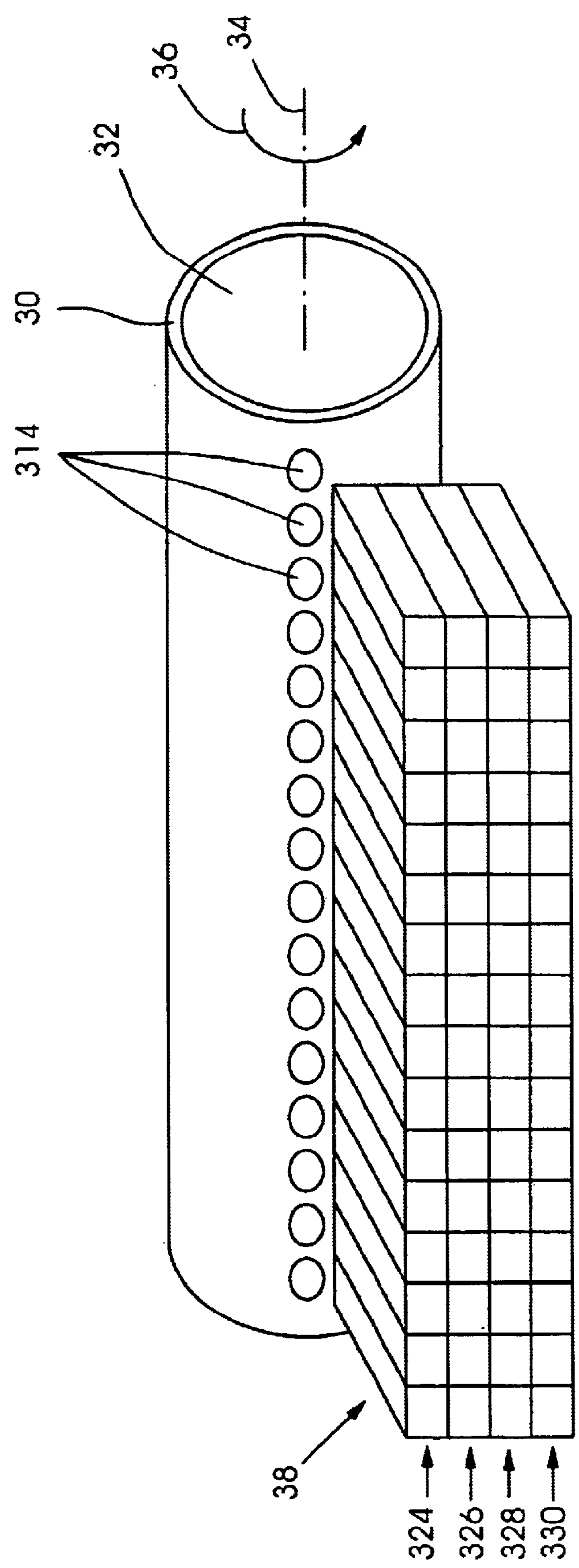
FIG. 5 is a fragmentary, perspective view of the device for exposing a printing form by the method of the invention.

FIG. 5 is a fragmentary diagrammatic perspective view of the device for exposing a printing form by the method of the invention. FIG. 5 shows the printing form 30 held on the carrier element 32 in the form of a cylinder. The carrier element 32 is shown rotatable about an axis 34 in the direction of rotation represented by the arrow 36. A drive, which is not shown here, is provided for producing the rotational movement. The array of exposure elements 38 extends over the full length of the printing form 30 on the carrier element 32. After exposure has been performed, this length is used for the print. By an array of exposure elements 38 over the full length which is provided for the print, a translation of the exposure elements in the direction of the axis 34, which requires additional time, can be avoided. At the same time, no typically complicated translation actuator mechanism is required. Here, by way of example, the array of exposure elements 38 has a first row 324, a second row 326, a third row 328 and a fourth row 330, respectively, having, as an example, sixteen individual exposure elements, which are assigned to imaging channels. In other words, the device includes sixteen columns, respectively, having four exposure elements. By the four imaging channels originating from the exposure elements in one column, points of projection 314 are produced on the printing form 30. In the device shown in FIG. 5, the method according to the invention can be used for each of the sixteen columns for exposing a printing form.

An embodiment of a device according to the invention as shown in FIG. 4 or FIG. 5 can be realized or implemented in a printing unit of a printing press.

Finally, it should be noted that, in an alternative embodiment, the exposure device, i.e., the array of exposure elements, which exposes a printing form by the method according to the invention, can also be constructed as a so-called in-drum exposer. In such a configuration, the array is disposed within the rotating carrier element (in-drum).

We claim:

1. A method for exposing a printing form, which comprises:

providing a plurality of exposure channels disposed in a two-dimensional array having columns and rows;

inputting energy, by the exposure channels of a column of the array, for an image element on the printing form;

activating a first row of the array of exposure channels for producing a first component of the input of energy assigned to each column of the array in one row of image elements;

moving the printing form relative to the exposure channels; and activating a second row of the array of exposure channels for producing a second component of the input of energy assigned to each column of the array when a point of projection of the exposure channel of a second row of the array comes to lie on the image element of the row already exposed by the exposure channel of the first row and the same column.

2. The method of exposing a printing form according to claim 1, which further comprises ensuring that at least two points of projection of two exposure channels in a column of the array do not coincide at one time on the printing form.

3. The method of exposing a printing form according to claim 1, which further comprises repeating the activating step for each further row of the array of exposure channels when the point of projection of the exposure channel of the further row of the array comes to lie on the image element already exposed by the exposure channel of the first row and the same column.

4. The method of exposing a printing form according to claim 1, which further comprises simultaneously activating the first row of the array of exposure channels for producing a first component of the input of energy assigned to each column of the array in a further row of image elements, while activating the second row of the array of exposure channels for producing a second component of the input of energy prescribed for each column of the array when the point of projection of the exposure channel of a second row of the array comes to lie on the image element belonging to the chronologically previously exposed row and already exposed by the exposure channel of the first row and the same column.

5. The method of exposing a printing form according to claim 1, which further comprises providing an array of regularly disposed imaging channels as the array of channels.

6. The method of exposing a printing form according to claim 1, which further comprises locating the point of projection of an exposure channel in the first row and in a specific column, and the point of projection of an exposure channel in the second row and in the same column, disjunctively in relation to one another in an image element.

7. The method of exposing a printing form according to claim 1, which further comprises ensuring that the points of projection of an exposure channel in the first row and in a specific column, and the point of projection of an exposure channel in the second row and in the same column coincide in an image element.

8. The method of exposing a printing form according to claim 1, which further comprises:

holding the printing form on a carrier element; and producing the movement of the printing form relative to the exposure channels by rotating the carrier element about an axis.

9. The method of exposing a printing form according to claim 1, which further comprises providing that the first component and the second component for producing the input of energy are of at least approximately the same size.

10. The method of exposing a printing form according to claim 1, which further comprises forming the plurality of imaging channels by light beams originating from a plurality of individually activatable laser light sources.

11. A device for implementing a method of exposing a printing form, comprising:

a plurality of exposure channels disposed in a two-dimensional array having columns and rows, said exposure channels of a column of said array causing an input of energy for an image element on the printing form; and a control unit including a computing unit, said computing unit having a memory unit, a computer program at least partially stored in said memory unit for operation by said computing unit, said computer program performing a row-by-row activation of said array of exposure channels for activating a second row of said array of exposure channels for producing a second component of the input of energy assigned to each column of said array upon a point of projection of the exposure channel of a second row of said array coming to lie on the image element of the row already exposed by the exposure channel of a first row and the same column.

12. The device for implementing the method of exposing a printing form according to claim 11, wherein said two-dimensional array of exposure elements extends over a full length of the printing form.

13. A printing unit, comprising a device for implementing a method of exposing a printing form, the device including:

a plurality of exposure channels disposed in a two-dimensional array having columns and rows, said exposure channels of a column of said array causing an input of energy for an image element on the printing form; and a control unit including a computing unit, said computing unit having a memory unit, a computer program at least partially stored in said memory unit for operation by said computing unit, said computer program performing a row-by-row activation of said array of exposure channels for activating a second row of said array of exposure channels for producing a second component of the input of energy assigned to each column of said array upon a point of projection of the exposure channel of a second row of said array coming to lie on the image element of the row already exposed by the exposure channel of a first row and the same column.

14. A printing press, comprising at least one printing unit having a device for implementing a method of exposing a printing form, the device including:

a plurality of exposure channels disposed in a two-dimensional array having columns and rows, said exposure channels of a column of said array causing an input of energy for an image element on the printing form; and a control unit including a computing unit, said computing unit having a memory unit, a computer program at least partially stored in said memory unit for operation by said computing unit, said computer program performing a row-by-row activation of said array of exposure channels for activating a second row of said array of exposure channels for producing a second component of the input of energy assigned to each column of said array upon a point of projection of the exposure channel of a second row of said array coming to lie on the image element of the row already exposed by the exposure channel of a first row and the same column.

* * * * *